350-6.8 SR SEARCH ROOM
XR 3,541,247

Nov. 17, 1970 M. E. MOI 3,541,247

ELECTRO-OPTICAL SCANNER

Filed June 28, 1967 2 Sheets-Sheet 1

CROSS REFERENCE

INVENTOR
MANFRED E. MOI
BY Carl V. Olson
ATTORNEY

3541247
OR IN 178/6.6B

ELECTRO-OPTICAL SCANNER

Filed June 28, 1967

2 Sheets-Sheet 2

INVENTOR
MANFRED E. MOI

BY Carl V. Olson
ATTORNEY 3,541,247

ELECTRO-OPTICAL SCANNER

Manfred E. Moi, Princeton, N.J., assignor to RCA Corporation, a corporation of Delaware Filed June 28, 1967, Ser. No. 650,572
Int. Cl. H04n 1/10
U.S. Cl. 178—6.6 11 Claims

ABSTRACT OF THE DISCLOSURE

An electro-optical scanner includes a rotatable disc having its periphery provided with a large number of progressively-oriented, discrete light reflecting or deflecting surfaces. A light beam such as a laser beam is directed to an incident point in the circular path of movement of the light deflecting surfaces. Each discrete light deflecting surface is oriented to cause a deflecting of a light beam to a respective discrete point along a line on a record sheet. The record sheet is supported by a carriage which moves at right angles to the scan line. The scanner can be used with an electrically modulated light beam to engrave or record graphic information on the record sheet, or can be used with a constant-amplitude light beam and a photoelectric-pickup to produce an electrical signal varying in accordance with graphic copy on the record carrier.

BACKGROUND OF INVENTION

Electro-optical scanners are usually constructed to consist of a stationary source of a light beam directed to the surface of a record-bearing cylinder which is continuously rotated and moved axially by means of a lead screw. When such scanner is used to translate graphic material into electrical signals for intermediate storage, it is desirable to employ digitized electrical signals (rather than analog electrical signals) because they are much more conveniently stored. When such a scanner is used for translating electrical signals into graphic records or engraved plates for half-tone printing, it is desirable that the graphic record or engraved plate consists of discrete, spaced elemental spots of varying density, or cavities of varying depth or size. A conventional electro-optical scanner is essentially an analog device not inherently providing the desired discrete elemental electrical and optical signals.

It is therefore an object of this invention to provide an improved electro-optical scanner in which a stationary light beam is deflected successively to discrete, spaced, elemental spots along a line on a record sheet.

It is another object to provide an improved electro-optical scanner in which the initial construction of a rotatable multi-faceted light deflector insures once and for all the subsequent precise registration and synchronism between corresponding elemental electrical and optical signals.

DETAILED DESCRIPTION

Figure 1:
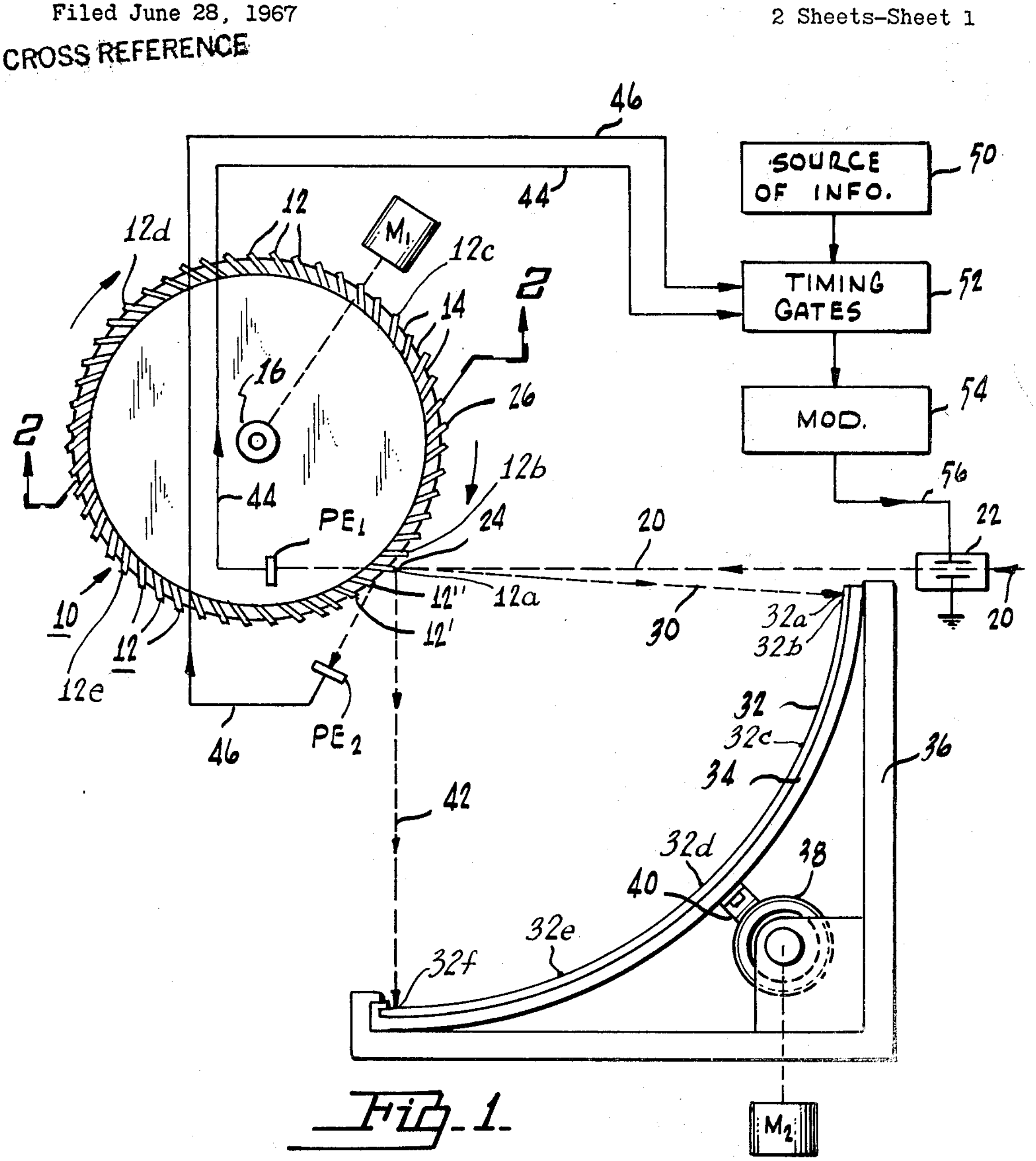
FIG. 1 is a diagrammatic representation of a scanner constructed according to the teachings of the invention.
Figure 2:
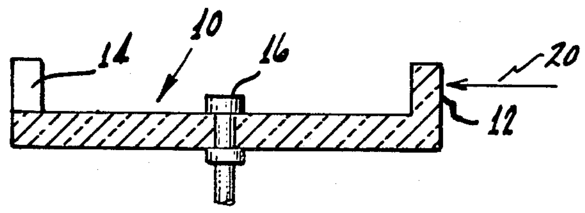
FIG. 2 is a sectional view of a portion of FIG. 1 taken on the line 2—2.
Figures 3, 4, 5:
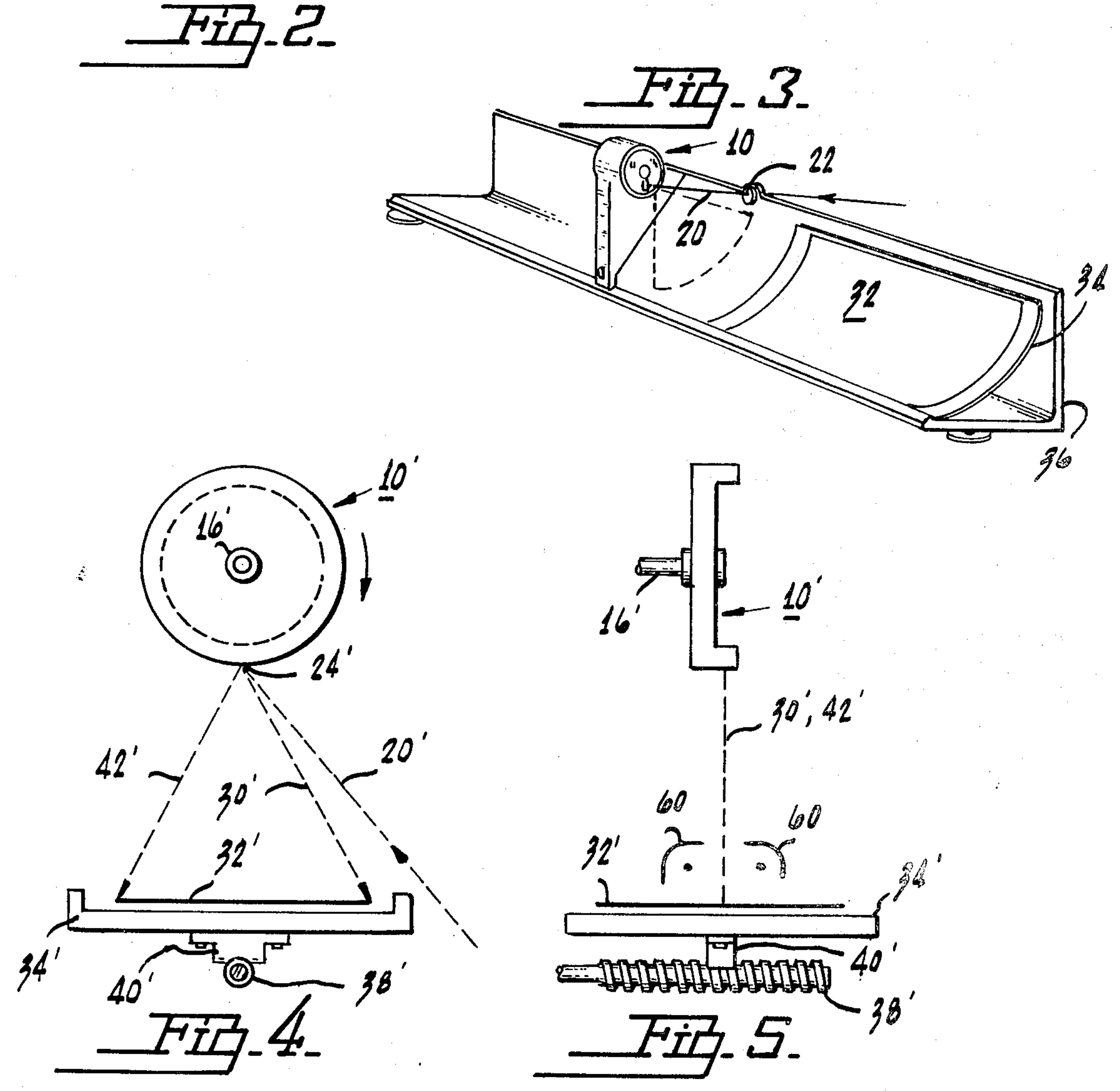
FIG. 3 is a perspective view of the mechanical portions of the system of FIG. 1.
FIG. 4 is a diagrammatic representation of a modified form of the system of FIG. 1.
FIG. 5 is a different view of the scanner of FIG. 4, and including photoelectric pickup means for light reflected from graphic copy.

The scanner system shown in FIGS. 1, 2 and 3 includes a disc generally designated 10 having a large number of discrete light deflecting or reflecting surfaces 12 positioned around its periphery. The light reflecting surfaces 12 are located on the ends of peripheral teeth having spaces 14 therebetween. The physical configuration of the disc 10 and its teeth 12 is somewhat like the configuration of a ring gear. However, the peripheral ends of the teeth 12 are provided with planar reflecting mirrors having progressively different orientations around the periphery of the disc 10, as will be explained. The disc 10 may be constructed of metal and provided with mirror surfaces on the ends of the teeth, or may be constructed entirely of glass with mirror surfaces on the ends of the teeth. The disc 10 is mounted on a central shaft 16 which is driven by a motor $M_1$.

Means are provided for directing a collimated, coherent laser beam 20 from a source (not shown) through a Kerr cell 22 to an incident point 24 on the periphery of the disc 10. The point of incidence 24 of the laser or light beam is preferably located at a point on the periphery of the disc 10 which is forty-five degrees displaced from a point 26 on the periphery through which passes an imaginary line parallel with the laser beam 20 and passing through the axis of the disc 10.

The disc 10 is shown in FIG. 1 in a position in which the laser beam 20 impinges at 24 on a reflecting surface 12 which is oriented so that the laser beam is reflected almost directly back along a path 30 to a beam-receiving record sheet 32. The record sheet 32 is held by a support 34 in the shape of a segment of a cylinder having an axis passing through the incident point 24. The support 34 is cradled in a rectangular guide 36 provided with a worm gear or lead screw 38, which is in turn driven by a motor $M_2$. The carrier 34 is provided with a rack 40 which engages the lead screw 38 for causing an axial movement of the record sheet 32 and support 34 relative to the disc 10.

As the disc 10 rotates, the discrete reflecting surfaces 12 successively reach and pass the incident point 24 of the laser beam 20. Each discrete light reflectance surface has a progressively different physical orientation so that the reflected laser beam is directed to progessively-spaced, discrete points along an arcuate line on the surface of the record sheet 32 during the course of one complete revolution of the disc 10. For example, the one discrete reflecting surface **12*a* is oriented at an angle of about 45° with the peripheral tangent to cause the incident beam 20 to be reflected along line 30 solely to the one discrete point 32*a* on the record sheet. As the disc 10 rotates, the beam is interrupted until the next reflecting surface 12*b* receives the incident beam. The surface 12*b* is oriented at a slightly smaller angle to the peripheral tangent to cause the beam to be reflected solely to discrete adjacent point 32*b* on the record sheet. Similarly, the reflecting surface 12*c* is oriented to cause the beam to be reflected solely to point 32*c*. Surfaces 12*d* and 12*e* are oriented to cause the beam to be reflected solely to respective points 32*d* and 32*e*. When the reflecting surface 12′ reaches the beam incident point 24, the beam is reflected along the path 42 to the point 32*f* on the edge of the record sheet 32 because the surface 12′** is oriented approximately parallel with the peripheral tangent.

If the desired elemental definition on the record sheet 32 is 100 spots per inch, and if the length of an arcuate line of scan on the record sheet in the sector between paths 30 and 42 is 8 inches, then the disc 10 should be provided with 800 discrete, progressively-oriented reflector surfaces 12. If the reflectors 12 are spaced 50 to the inch around the periphery of disc 10, the disc should have a diameter of 5.1 inches. The reflectors 12 may then have a surface dimension of about 0.010 inch. The laser beam may have a cross sectional dimension of about 0.004 inch.

When a notch or space 14 between reflector teeth 12 on the disc 10 is at the beam incident point 24, the laser beam 20 continues past the periphery of the disc 10 to a first light responsive cell or photoelectric cell $PE_1$. The output on line 44 from cell $PE_1$ is thus an electrical clock pulse wave useful for synchronizing purposes as will be described.

One of the light reflecting surfaces 12″ on one peripheral tooth of the disc 10 is oriented at a sufficiently great angle to cause the laser beam 20 to be reflected from the incident point 24 to a second light responsive cell or photoelectric cell $PE_2$. The output of cell $PE_2$ on line 46 is thus an electrical indexing pulse which occurs once during each complete revolution of the disc 10, and occurs only at the time when reflecting surface 12″ is at the beam incident point 24.

FIG. 1 illustrates the scanner of the invention employed as a recorder for translating electrical signal information into a graphic image on the record sheet 32. The graphic sheet 32 may be a sheet of photographic or other light sensitive material. However, the illustrated invention is even more useful when the record sheet 32 is a sheet of material, such as metal, capable of being engraved by the laser beam reflected thereto over paths between the extreme paths 30 and 42. The record sheet 32 may, after being engraved, constitute a printing plate for transferring ink to paper in a printing press, or may be a sheet useful for casting a printing plate.

The system of FIG. 1 includes conventional electrical circuitry for translating sequentially presented electrical information into corresponding variations in the intensity of the laser beam 20. A source 50 of electrical information may include a computer having a memory in which the information is stored and having means to feed out the information when needed. The information is supplied from source 50 to timing gates 52 which also receive the clock pulse synchronizing wave on lead 44 and the indexing pulse wave on line 46. The timing gates 52 permit the information from the source 50 to be supplied to a modulator 54 at instants of time precisely synchronized with the rotation of disc 10. The modulator 54 translates the electrical information supplied to it, which normally will be digital information, to an electrical modulating signal which is applied over line 56 to the Kerr cell 22 positioned in the path 20 of the laser beam. The digital information supplied to the modulator 54 may be an elemental pulse or an absence of a pulse to represent graphic black or white, respectively. On the other hand, the digital information may consist of groups of three "1" and/or "0" bits which may be decoded in the modulator 54 to corresponding ones of eight amplitudes representing eight gray scale values.

In the operation of the system of FIG. 1, a printing plate record sheet 32 is engraved in accordance with graphic information which is stored in electrical digital form in the source 50. Initially, the motors $M_1$ and $M_2$ are started and allowed to reach their steady-state rotational speeds. The motors $M_1$ and $M_2$ may be electrically or mechanically synchronized by means not shown. The motor $M_1$ causes a constant high speed rotation of the disc 10 and the motor $M_2$ causes a rotation of the worm or lead screw 38 and an axial movement through the rack 40 of the carrier 34 holding the record sheet 32. The laser beam 20 continuously directed to the beam incident point 24 is successively reflected by each passing reflecting surface 12 to a respective discrete point on an arcuate line on the surface of record sheet 32. The electrical source of information 50 is then passed, under control of the timing gates 52, to the modulator 54 to control the intensity of the laser beam 20 passed through the Kerr cell 22. Each discrete point on the surface of the record sheet 32 is thus engraved or drilled to a depth or an extent determined by the momentary existing amplitude of the laser beam as determined by the Kerr cell 22. The information engraved on the record sheet 32 may be half-tone graphic information, may be black-and-white line drawings, may be printing text, or may be combinations thereof.

FIG. 4 illustrates a modification of the scanner of FIG. 1, the modification comprising the use of a planar support 34′ for holding a record sheet 32′ in a flat plane. The disc 10′ is constructed like the disc 10 in FIG. 1, but the individual reflecting surfaces 12 are arranged in orientations designed to cause the laser beam 20 to impinge on equally spaced points of the record sheet 32′ as the disc 10′ rotates. In some printing methods, it is required that the printing plate be of planar, rather than cylindrical shape. In this case, the arrangement of FIG. 4 is particularly useful. The record sheet 32′ to be engraved may be engraved without any distortion due to the varying length of the reflected light paths from the incident point 24′ because the reflecting surfaces on the disc 10′ are initially constructed with orientations such that the disortion does not appear on the engraved plate 32′. Another reason why the arrangement of FIG. 4 is capable of producing distortion-free engraving is that the laser beam 20 is a collimated beam having a substantially constant cross-sectional area regardless of the distance traveled. Therefore, the cross-sectional size of the laser beam reaching the record sheet 32′, in transversing the sector bounded by paths 30′ and 42′, remains constant.

The scanner of the invention is also useful for translating graphic material, such as photographs, or text, or both, into electrical signals stored in a computer memory unit. FIG. 5 shows such a use of a scanner in which a laser beam of constant, unmodulated amplitude is directed to the disc 10′ and reflected to successive discrete spots on a graphic copy record sheet. The beam is reflected from the graphic copy at each spot of impingement thereon with an amplitude in accordance with the density of the graphic copy. The light reflected from the copy is scattered but is effective to appropriately energize elongated light responsive photoelectric units 60 positioned along the line transversed by the successively illuminated spots. If the graphic copy material 32′ is a photographic transparency, the photoelectric units 60 are, of course, placed on the far side of the graphic copy to pick up light transmitted through the transparency. If the graphic copy is maintained in a cylindrical shape by a carrier 34 of the type shown in FIG. 1, the photoelectric cell units should, of course, be constructed as elongated arcuate units conforming to the arcuate line on the graphic copies scanned by successive pulses of light.

What is claimed is:

1. An optical scanner comprising:

a rotatable disc having its periphery provided with a large number of progressively-oriented, discrete, light deflecting surfaces, said surfaces being oriented at progressively different angles relative to the peripheral tangent of the disc, means to direct a light beam to an incident point in the circular path of movement of said light deflecting surfaces, a carriage for supporting a record sheet, said discrete light deflecting surfaces being dimensioned and progressively oriented to each cause a deflection of the light beam solely to a respective discrete point spaced along a scan line on said record sheet, and means to provide movement, relative to said disc, of said carriage and record sheet at right angles to said scan line.

2. A scanner as defined in claim 1, and in addition a first light responsive cell positioned to receive the light of said beam at intervals synchronized with its impingement on successive light deflecting surfaces to generate synchronizing electrical clock pulses.

3. A scanner as defined in claim 2, and in addition a second light-responsive cell positioned to receive the light of said beam at one angular position of said rotatable disc to produce one electrical indexing signal pulse for each rotation of said disc.

4. A scanner as defined in claim 3, and in addition means operated under control of said clock pulses and indexing pulses to modulate said incident light beam with information.

5. A scanner as defined in claim 1 wherein said light deflecting surfaces are reflectors.

6. A scanner as defined in claim 1 wherein said light beam is a laser beam.

7. A scanner as defined in claim 1 wherein said carriage supports said record sheet in the shape of a segment of a cylinder.

8. A scanner as defined in claim 1 wherein said carriage supports said record sheet in a flat plane.

9. A scanner as defined in claim 5 wherein said reflectors are positioned on the ends of teeth on the periphery of said disc.

10. A scanner as defined in claim 9 and in addition a photoelectric cell positioned to receive said beam when it passes between said teeth to generate a synchronizing clock pulse wave.

11. A printing plate engraver comprising:

a rotatable disc having spaced peripheral teeth provided with end mirror surfaces, a source of a laser light beam directed to the peripheral edge of said rotatable disc to successively impinge on the end mirror surfaces of said peripheral teeth and be reflected therefrom, a carriage for supporting a record sheet, said end mirror surfaces being each oriented at a slightly different angle in a progressive fashion to cause the laser beam to successively be reflected solely to discrete spaced points along a scan line on said record sheet, lead screw means to provide axial movement of said carriage and record sheet relative to said rotatable disc, a light-sensitive cell positioned to receive light passed between the teeth on said rotatable disc and generate electrical clock pulses in response to, an indexing light responsive cell positioned to receive light reflected from an indexing one of said teeth to produce an electrical indexing signal for each revolution of said disc, a Kerr cell in the path of said light beam, and electrical means operated under control of said clock pulses and indexing signal to apply electrical information signals to said Kerr cell to modulate said laser beam.

References Cited

UNITED STATES PATENTS

| | | | |
|---|---|---|---|
| Re. 19,862 | 2/1936 | Adsit | 350—7 |
| 3,154,371 | 10/1964 | Johnson | 350—7 |

ROBERT L. GRIFFIN, Primary Examiner

B. LEIBOWITZ, Assistant Examiner

U.S. Cl. X.R.

350—7